March 14, 1961 A. N. MILLER 2,975,402

DATA COMPARATOR

Filed March 29, 1954 7 Sheets-Sheet 1

*INVENTOR.*
ASA N. MILLER

*BY* J. Jancin Jr.

ATTORNEY

March 14, 1961 A. N. MILLER 2,975,402

DATA COMPARATOR

Filed March 29, 1954 7 Sheets-Sheet 2

INVENTOR.
ASA N. MILLER

BY

ATTORNEY

INVENTOR.
ASA N. MILLER
BY
J. Tancin Jr.
ATTORNEY

March 14, 1961 A. N. MILLER 2,975,402

DATA COMPARATOR

Filed March 29, 1954 7 Sheets-Sheet 4

*INVENTOR.*
ASA N. MILLER

*BY* J. Tancin Jr.

ATTORNEY

INVENTOR.
ASA N. MILLER
BY J. Jancin Jr.
ATTORNEY

March 14, 1961 A. N. MILLER 2,975,402

DATA COMPARATOR

Filed March 29, 1954 7 Sheets-Sheet 6

INVENTOR.
ASA N. MILLER

BY J. Tancin Jr.

ATTORNEY

March 14, 1961 A. N. MILLER 2,975,402

DATA COMPARATOR

Filed March 29, 1954 7 Sheets-Sheet 7

INVENTOR.
ASA N. MILLER

BY J. Jancin Jr.

ATTORNEY

United States Patent Office 2,975,402

Patented Mar. 14, 1961

2,975,402

DATA COMPARATOR

Asa N. Miller, Hallstead, Pa., assignor to International Business Machines Corporation, New York, N.Y., a corporation of New York Filed Mar. 29, 1954, Ser. No. 419,475

9 Claims. (Cl. 340—147)

This invention relates to data comparing devices in general.

Heretofore, various mechanical, electromechanical and electronic data comparators have been devised for use to compare one expression of information with another expression of information. Very often, such comparators also provide means to determine the relative magnitude between the expressions. As a general rule, the comparing positions wherein the data being analyzed are manifested, are connected in tandem, and the comparing positions are effective for analysis purposes one by one as each of the comparing positions is checked successively. In addition, the relative magnitude of one expression of information with respect to the other expression of information is determined by, and corresponds with, the relative magnitude of the orders of data in the first unmatched, or unequal, comparing position.

Many times it is expedient and efficient to pass as matched, or equal, expressions of information, those unmatched expressions which bear a predetermined degree of resemblance to one another. Such differences, for example, may be a cross-compare error as is shown in position 4 of Fig. 3; a transposition-of-orders error as is shown in positions 3 and 4 of Fig. 4; a "right-offset" error such as is shown in Fig. 5, i.e., one in which the orders of data in one expression are offset to the right with respect to the other expression; and a "left-offset" error such as is shown in Fig. 6, i.e., one in which the orders of data of one expression are offset to the left with respect to the other expression. Certainly, many persons may spell a name, or the like, according to its phonetic sound, e.g., Allan instead of Allen, and many persons may transpose data unknowingly, e.g., 54239 instead of 54329. It is a generally accepted fact that errors of the afore-mentioned kind occur very frequently, and it is for this reason that such errors are quite often termed "human errors."

To amplify the foregoing paragraph, it is assumed, for example, that a record card collating operation is being performed on either of the well-known Types 077 and 089 IBM Collators. Normally, as is well known to persons familiar with this art, record cards are detected as being unmatched by these machines whenever there is any difference whatsoever between orders of data in any comparing position. Very often, and especially if a difference of data is due to one of the afore-mentioned so-called human errors, the record card detected as being unmatched and which was rejected during the collating operation, is subsequently hand-filed in its proper place. In most cases the record card is not corrected because it will not be used again for collating purposes. Thus, it is clear that if record cards having an error of the afore-mentioned type, are permitted to pass as matched cards, the aforesaid hand-filing operation will not be necessary. The avoidance of such hand-filing operations, it has been determined, will save many tens of thousands of dollars per annum.

Accordingly, an object of this invention is to provide a data comparing device which is capable of detecting a variety of errors and adaptable to solve problems which hitherto required human labor to perform.

Although the present invention is shown and described to be embodied in a record card distributing machine such as the well-known IBM card collator which is the subject of U.S. Patent No. 2,602,544 granted to B. E. Phelps et al. and issued on October 3, 1944, it is not intended to limit the scope of this invention to such a machine. It will be understood that fundamental novel features of the invention are only applied to a preferred embodiment and that various omissions and substitutions and changes in the form and details of the device illustrated and described may be made by those skilled in the art, without departing from the spirit of the invention.

An object of this invention is to provide an improved data comparator which affords efficient data processing operations.

Another object of this invention is to provide apparatus for reconciling a first entity of data with a second entity of data.

Another object of this invention is to provide a data comparator for detecting designated errors and passing the same as no errors at all.

A still more specific object of this invention is to provide a data comparing device for detecting a single cross-compare error, a single transposition-of-orders error, a single right-offset error, and/or a single left-offset error.

Another object of this invention is to provide a data comparator for comparing orders of data which are correlated in a plurality of relationships.

In keeping with the foregoing, another object of this invention is to provide a data comparator for selectively comparing homologous and non-homologous positions of data.

Other objects of the invention will be pointed out in the following description and claims and illustrated in the accompanying drawings, which disclose, by way of example, the principle of the invention and the best mode which has been contemplated, of applying that principle.

Figure 9A:
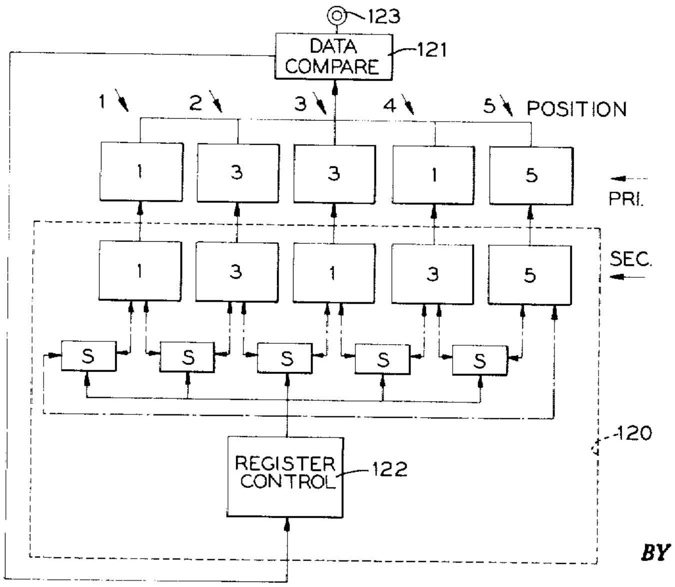
Figure 9B:
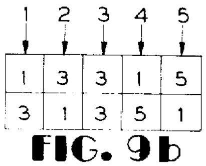
Figure 9C:
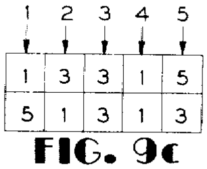

Figs. 9*a* to 9*c*, inclusive, illustrate diagrammatically a shifting register type of data comparator.

Figure 10A:
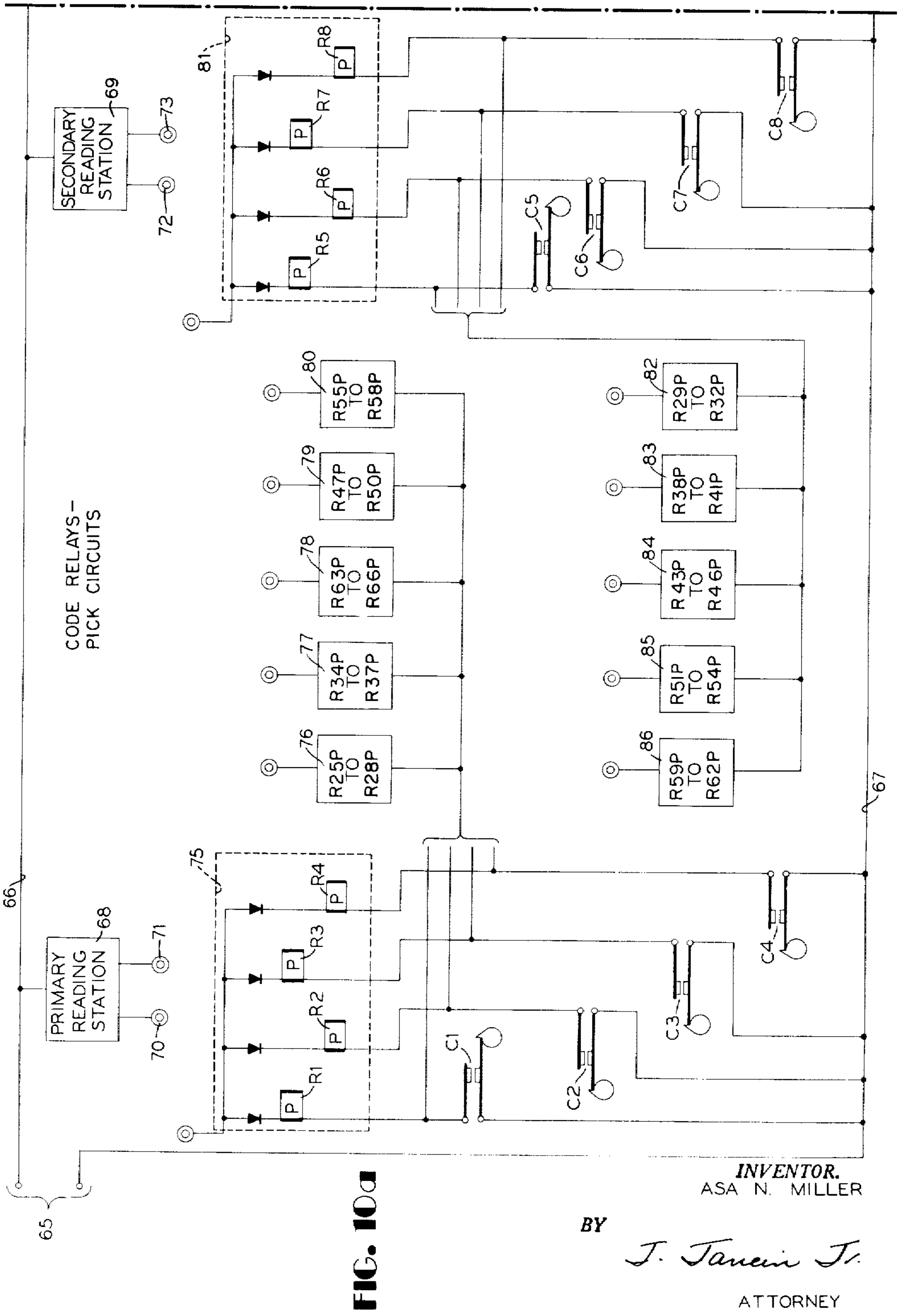
Figure 10B:
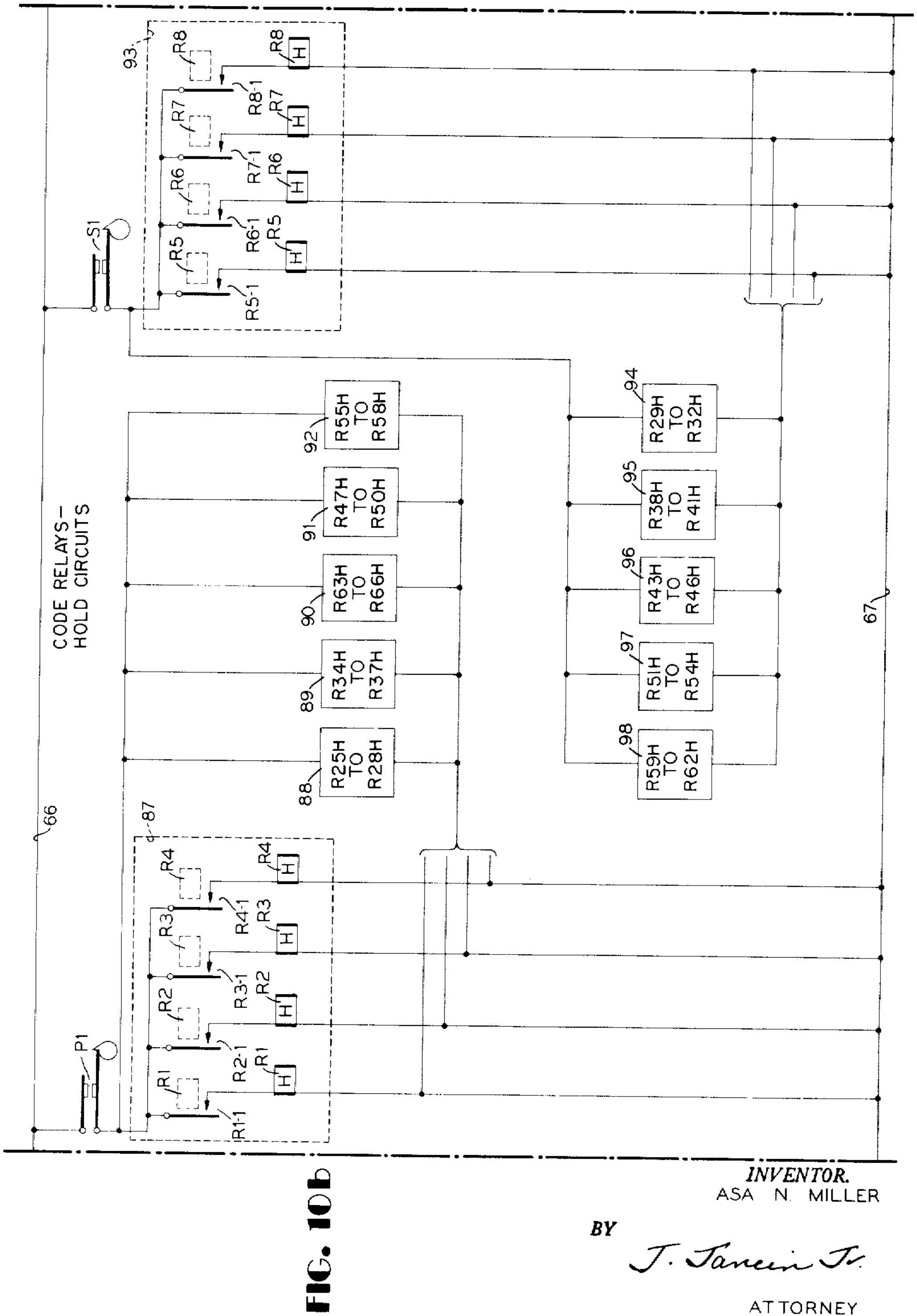
Figure 10C:
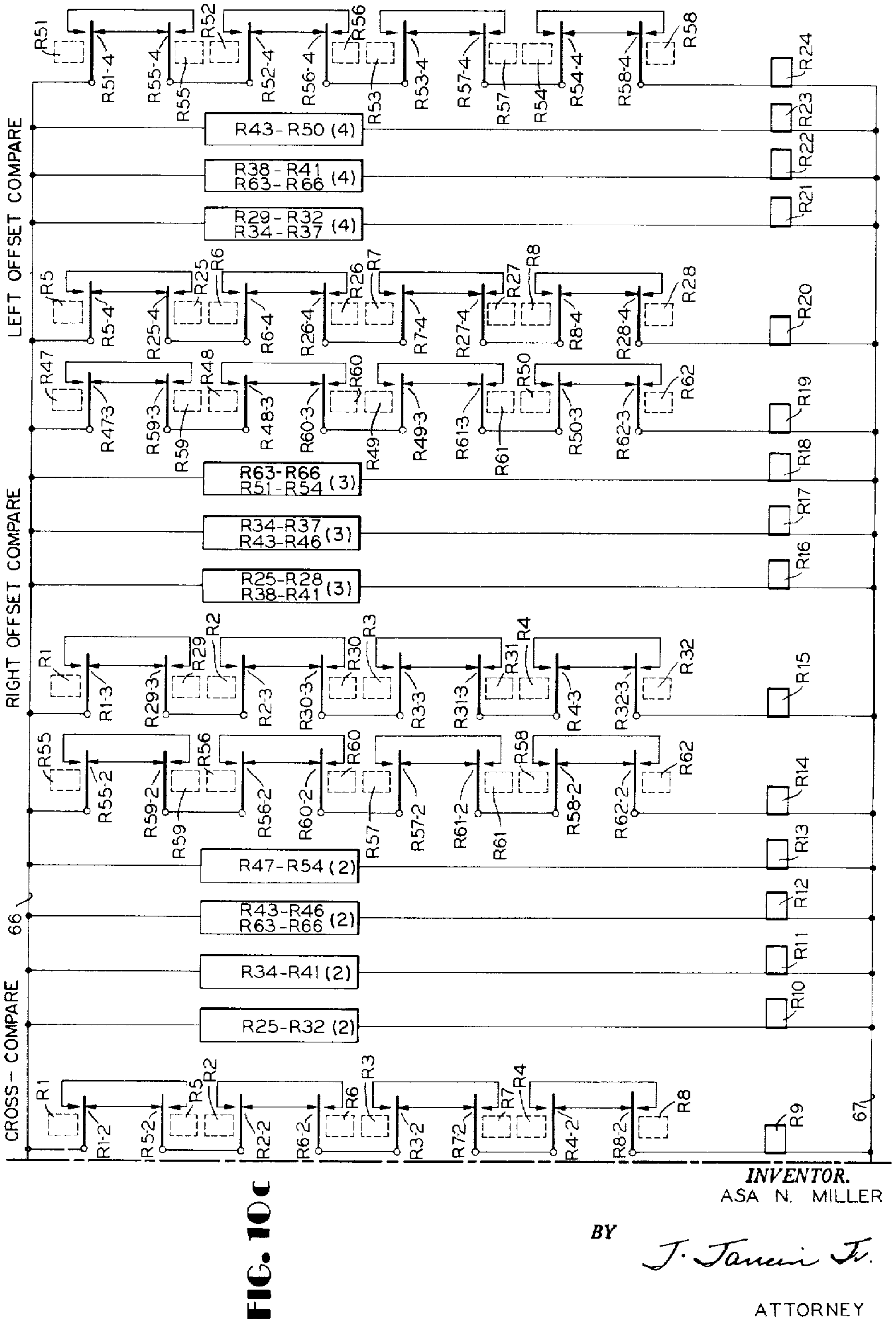
Figure 11:
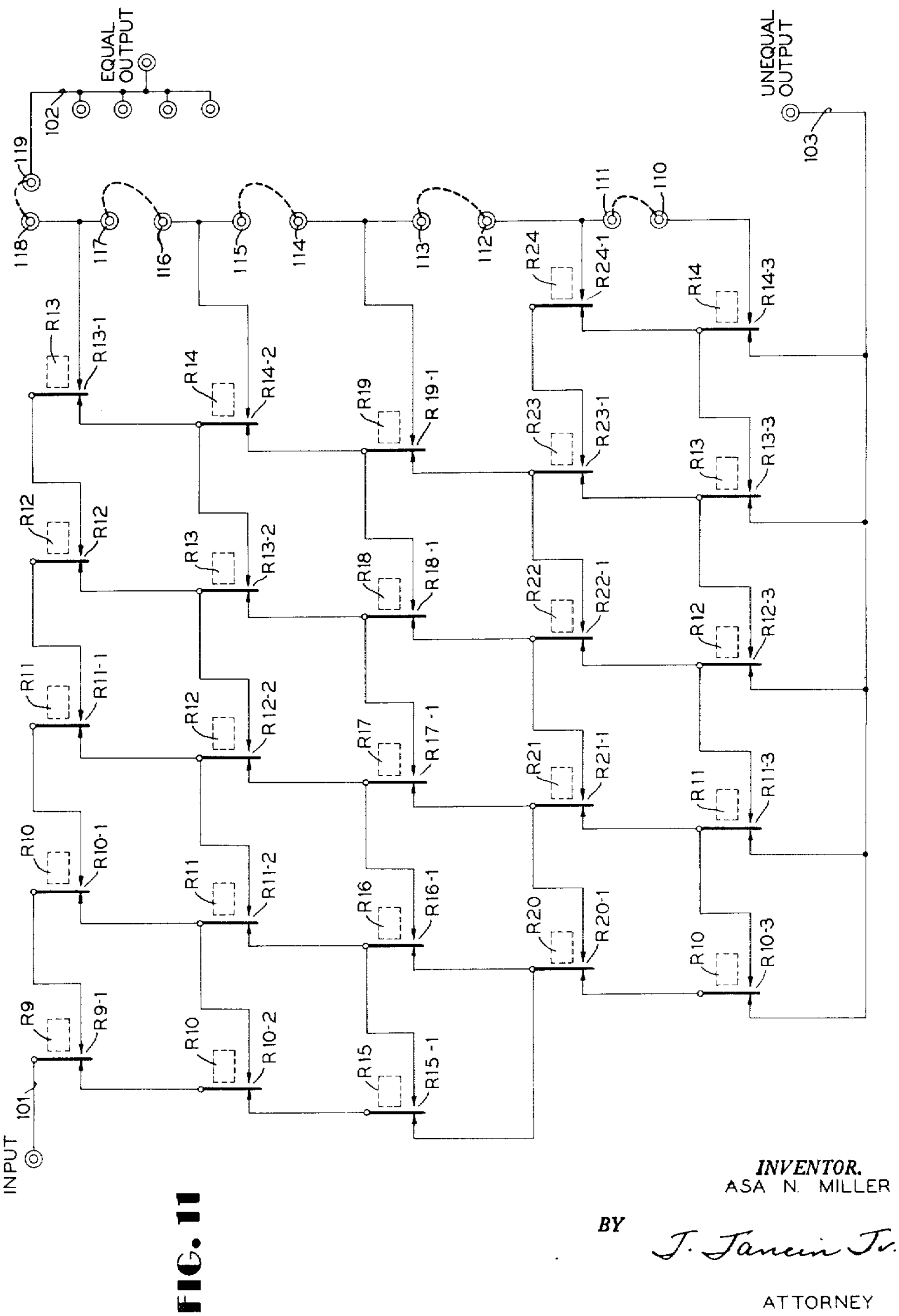

Figs. 10*a* to 10*c*, inclusive, and Fig. 11, form a wiring diagram for the data comparator and associated apparatus.

Figure 12:
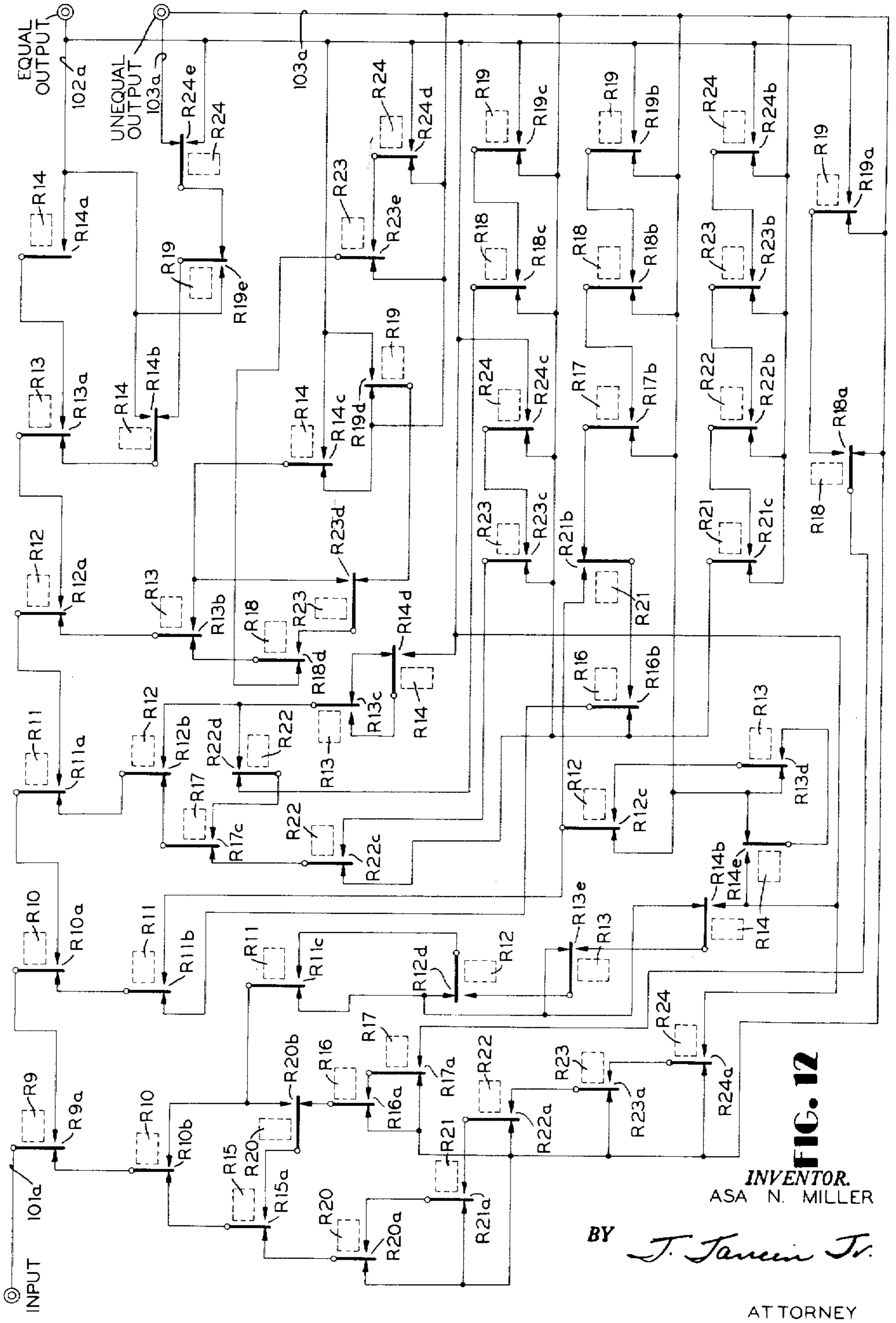

Fig. 12 is a wiring diagram for an analyzing circuit which may be used in place of the one in Fig. 11.

*Collator description*

As stated previously, the preferred embodiment of the present invention is shown and described to be employed in a record card controlled collator similar to one disclosed in Phelps et al. Patent No. 2,602,544. Inasmuch as this Phelps et al. collator which is similar to the well-known Type 089 IBM machine, is shown and described fully in the aforesaid patent, it will be described only briefly herein with relationship to the somewhat schematic diagram shown in Fig. 1 and the block diagram shown in Fig. 2, to thereby avoid unnecessary complexity and undue prolixity in the present specification.

Figure 1:
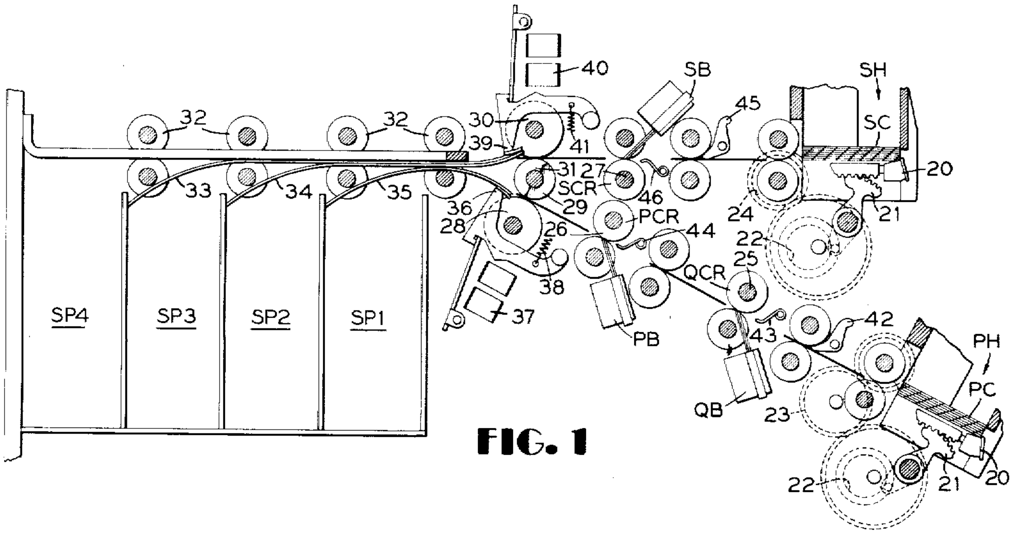
Fig. 1 is a somewhat diagrammatic view of a record card collating machine for handling two batches of cards.

Referring to Fig. 1, cards placed in primary hopper PH are designated PC and called primary cards. Cards in secondary hopper SH are designated SC and referred to as secondary cards. Pickers 20 are adapted to feed cards out of the hoppers. The pickers have rack teeth meshed with gear segments 21 which are oscillated by box cams 22 rigid with gears 23 and 24. Gear 23, in the primary side, is driven through a suitable clutch controlled gear train as is gear 24, in the secondary side. The two contact roll shafts 25 and 26 in the primary side and the contact roll shaft 27 in the secondary side, are also suitably connected to their respective, aforementioned gear trains. Both the primary and secondary card feeds are under control of associated feed clutches (not shown) represented by block 59 in Fig. 2. Contact roll shaft 25, in the primary side, carries contact roll QCR coacting with reading brushes QB to read primary cards passing through the sequence station. The contact roll shaft 26, in the primary side, carries contact roll PCR coacting with reading brushes PB to read primary cards traversing the primary station. The shaft 27, in the secondary side, carries a contact roll SCR to coact with brushes SB to read secondary cards as they traverse the secondary station.

With the primary feed in operation, the related picker 20 will feed a card from the hopper PH. The card will be fed further by the feed rollers in the primary side to eject rollers 28 and 29. With the secondary feed in operation, a card will be fed from the hopper SH by the related picker 20, and thence by the feed rollers to the eject rolls 30 and 31. The eject rolls 30 and 31 are driven by the secondary feed drive mechanism, whereas the primary eject rolls 28 and 29 are driven through a separate drive means including a one-revolution eject clutch (not shown).

Four feed rollers 32 are driven to coact with feed rollers on companion shafts so as to feed the cards issuing from the eject rolls to a selected one of four card stacker pockets to which the cards may be selectively distributed. The pockets are designed SP1, SP2, SP3 and SP4. There are three guide blades 33, 34, and 35 for directing cards to selected pockets. Blade 35 rests at the rear upon the toe of a lever 36 associated with the magnet 37. With this magnet inactive, cards issuing from primary eject rolls 28 and 29 pass over the blade 35 into pocket SP2. Upon the energization of magnet 37, the related lever 36 is unhooked, allowing it to be moved upwardly by a spring 38, and thereby to lift the rear end of blade 35. A card issuing from eject rolls 28 and 29 will then pass under blade 35 into pocket SP1. The rear end of top blade 33 extends under the toe of the lever 39 associated with the magnet 40, while the rear end of the blade 34 extends under the toe of a similar lever (not shown) associated with a magnet (also not shown) similar to magnet 40. With both foregoing magnets de-energized, cards issuing from secondary feed eject rolls 30 and 31, feed under blade 34 into pocket SP2. With the afore-mentioned magnet which is similar to magnet 40, energized, blade 34 is depressed at the rear end to allow cards issuing from eject rolls 30 and 31 to pass over this blade and under blade 33 into the pocket SP3. When magnet 40 is energized, it unhooks the lever 39 associated therewith and also the lever (not shown) similar thereto associated with the magnet (also not shown) which is similar to magnet 40, allowing the attached spring 41 to rock these levers counterclockwise. Consequently, blades 33 and 34 are both depressed, and a card issuing from eject rolls 30 and 31 will pass over both blades into the pocket SP4.

There are, of course, various card lever contacts, hopper contacts, cam contacts, etc. The primary feed card lever contacts are represented by levers 42, 43 and 44, and the secondary feed card lever contacts are represented by levers 45 and 46. The various cam contacts shown in the circuit diagrams are of three classes. One class comprises continuously operating cam contacts given the general designation C. A second class includes those contacts operated only when the primary feed is operative, and cam contacts in this class have the general designation P. The third class includes contacts which operate only when the secondary feed is operative, and these cam contacts have the general designation S.

As usual, the reading brushes for sensing card information are connected to plug sockets which appear in a plugboard panel. These pluggable connections are provided to allow for flexible control, and for any chosen field of card columns to be ultimately compared.

*General description*

Figure 2:
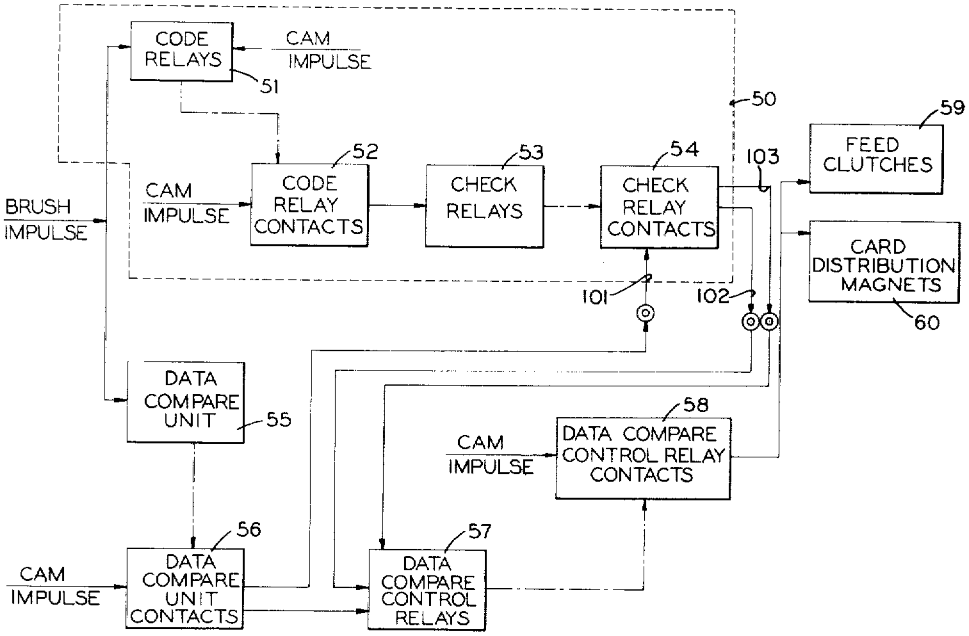
Fig. 2 is a block diagram depicting the general scheme of operation for the afore-mentioned record card collating machine wherein the present invention is shown to be embodied.

Referring to Fig. 2, the preferred embodiment of the present invention is indicated in block diagram form to be within broken line 50 as a part of the afore-mentioned collator wherein, once again, the preferred embodiment of the present invention is utilized. The code relays R1 (see also Fig. 10*a*)–R8, R25–R32, R34–R41, and R43–R66 which are represented in Fig. 2 by block 51, are picked during a machine card feed cycle consequent upon a coincidence between cam directed impulses, e.g., those directed by cam contacts C1 (Fig. 10*a*)–C8, and record card governed reading brush controlled impulses, e.g., those transmitted from within primary and secondary record card data reading stations 68 and 69. After select code relays are operated and held operated via circuits shown in Fig. 10*b*, so as to manifest the record card data sensed, another cam controlled test impulse is then directed through various code relay contacts represented by block 52 in Fig. 1 and shown in detail in Fig. 10*c*, in order to energize select check relays R9 (Fig. 10*c*)–R24. These check relays are represented by block 53 in Fig. 1, and are for operating the check relay contacts shown in the analyzing circuits of Figs. 11 and 12 which are represented by block 54 in Fig. 1.

As the description advances, it will become clear that the cross-compare, or as used hereinafter the same relative or corresponding position or homologous order data, check relay contacts associated with the check relays R9 (Fig. 10*c*)–R14, are analyzed order-by-order first in an effort to determine the relationship between the primary and secondary data groups. Should a predetermined number of unequal cross-compare positions be realized by the aforesaid analyzing means, non-homologous check relay contacts in the form of a right offset and a left offset, will then be analyzed. It is via these check relay contacts that a test signal voltage is directed to either "equal" data line 102 (Fig. 11) of "unequal" data line 103.

A right offset non-homologous arrangement is realized consequent upon the comparison of any given order of primary data with the next lower order of secondary data. On the other hand, a left offset non-homologous arrangement is realized consequent upon the comparison of any given order of primary data with the next higher order of secondary data. The process followed in the preferred embodiment of the present invention includes the following steps:

(1) Analyzing, order-by-order, the cross-compare comparison results as manifested by the action of the cross-compare check relay contacts.

(2) In response to the recognition of a predetermined number of cross-compare data unequals, analyzing order-by-order the right offset comparison results as manifested by the action of the right offset check relays, and beginning this offset comparing with the primary order next preceding the one whereat the last of the predetermined number of cross-compare data unequals was recognized.

(3) In response to the recognition of a predetermined number of right offset data unequals, analyzing order-by-order the left offset comparison results as manifested by the action of the left offset check relay, and beginning this offset comparing with the primary order whereat the last of the predetermined number of right offset data unequals was recognized.

(4) Finally, analyzing order-by-order, once again, the cross-compare comparison results as manifested by the action of the cross-compare check relay contacts, and beginning this comparing operation in response to the recognition of a predetermined number of left offset data unequals with the primary order whereat the last of the predetermined number of left offset data unequals, was recognized. It will become clear as the description advances that although the primary and secondary data expressions as originally manifested by the code relays, may not match, if the difference in expression is due to one of the previously-mentioned so-called human errors, a voltage signal along "equal" data line 102 will be realized so as to effect the broad object of the present invention; that is, to pass certain data unequals as though they were equal.

Figure 3:
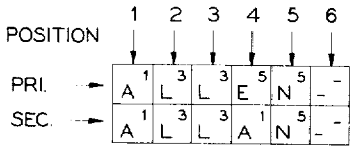
Figs. 3 through 6 illustrate cross-compare, transposition-of-orders, right-offset, and left-offset errors, respectively.

The collating machine described in the afore-mentioned Phelps et al. patent is, in general, represented in Fig. 2 by blocks 55 through 60. In view of the fact that this machine is described in detail in the aforesaid patent, and since the machine per se is not a part of the present invention, it is necessary to describe the machine only briefly. Record card data reading brush impulses which are directed to a data compare unit 55 similar to that shown in Fig. 3*a* of the Phelps et al. patent, cause a transfer of select data representing compare unit contacts represented by block 56. These contacts might be arranged similarly to those shown in Fig. 3*e* of the Phelps et al. patent. If the data to be compared are unequal, a cam governed test impulse will be directed through the labyrinth of compare contacts represented by block 56, and to the labyrinth of check relay contacts within block 54 via line 101. On the other hand, if the data entered into unit 55 are equal, the aforementioned test impulse will be directed through the labyrinth of compare contacts 56 directly to the data compare control relays in block 57 via the equal line directly connecting the two units 56 and 57. The reason for this should be clear inasmuch as if the primary and secondary data being compared are equal, there is no need to use the present invention which is for passing certain unequals as equals. Therefore, the apparatus representing the present invention may, in general, be by-passed when the original primary and secondary expressions are matched. However, if the data being compared are unequal, it is still necessary to determine whether these data have a predetermined relationship which calls for passing the data as equal. If there is this relationship, such as the single cross-compare as shown in Fig. 3 for example, the present invention will, in effect, instruct the collating machine to overlook the actual unmatched relationship and to pass the unequal data as equal data.

As is shown in Fig. 2, the check relay contacts block 54 has two output lines 102 and 103 (see also Fig. 11). If the primary and secondary data detected as being unequal by the data compare unit block 55 (Fig. 1), is a particular type of so-called human error which it is desired to pass as no error at all, a test impulse signal will appear along the line 102, which impulse will appear as an equal data compare impulse when applied to the data compare control relays 57. On the other hand, if these unequal data do not fall within any of the aforementioned categories to be passed as equal data, a test impulse signal will appear along the line 103, which signal will then cause operation of a so-called unequal data compare control relay within block 57. The energization of the data compare control relays (not shown) in block 57 set up the collator governing control relay contacts represented by block 58. A cam impulse directed through the contacts in unit 58 controls the necessary collator primary, secondary and eject feed clutches represented by block 59, as well as the record card distribution magnets represented by block 60. The operation of the latter mentioned apparatus is in a manner similar to that shown and described in the afore-mentioned Phelps et al. patent and in a manner well known to those persons having ordinary skill in this art.

*Data comparator*

Referring to Fig. 10*a*, a suitable power supply represented by bracket 65 causes operating voltages to be applied to lines 66 and 67. Blocks 68 and 69 represent the primary and secondary reading stations which include brushes PB (see also Fig. 1) and SB, respectively. Hubs 70 and 71 are each connected to primary brushes for reading respective primary card columns 1 and 80, for example, and hubs 72 and 73 are connected to secondary brushes for reading respective secondary card columns 1 and 80, for example.

Code relay units 75 through 80 are associated with the primary card reading station, and code relay units 81 through 86 are associated with the secondary card reading station. Only primary unit 75 and secondary unit 81 are shown in detail, the other units being similar thereto. Cams C1 and C5 are timed so that their contacts close at 1, 4 and 7 index times which correspond to related indicia points in a record card; cams C2 and C6 are set so that their contacts close at 2, 5 and 8 index times; cams C3 and C7 are timed so that their contacts close at 3, 4, 5 and 9 index times; and cams C4 and C8 are set so that their contacts close at 6, 7, 8 and 9 index times. Hence, the code relays, R1 through R8 for example, are conditioned for energization in accordance with the following code:

1 index time—relays R1 and R5
2 index time—relays R2 and R6
3 index time—relays R3 and R7
4 index time—relays R1, R3, R5 and R7
5 index time—relays R2, R3, R6 and R7
6 index time—relays R4 and R8
7 index time—relays R1, R4, R5 and R8
8 index time—relays R2, R4, R6 and R8
9 index time—relays R3, R4, R7 and R8

Coincidently timed reading brush impulses from line 66 through stations 68 and 69 and the rectifiers shown in units 75 and 81, cause the selective energization of these relays.

The hold coils for the relays R1 through R8 are shown in Fig. 10*b* to be in blocks 87 and 93, respectively. The hold coils within blocks 87 through 92 are associated with the pick coils in blocks 75 through 80, respectively, and the hold coils within blocks 93 and 98 are associated with the pick coils in blocks 81 through 86, respectively. As is shown, the hold coils are energized through their respective stick points whenever the pick coil associated with a given hold coil, is energized. The primary code relay hold coils, such as R1 through R4 for example, are held through primary cam P1, whereas the secondary code relay hold coils R5 through R8, for example, are held through secondary cam S1. Inasmuch as the aforesaid primary and secondary cams operate only during the operation of a corresponding card feed unit, these cams are used to control the hold coils of the code relays so that those relays which are picked during one machine cycle will remain picked for the number of machine cycles that the corresponding feed is stopped.

The code relay contacts associated with the code relays, such as relays R1 through R8 for example, are shown in Fig. 10*c*. The circuits including these contacts are divided into three categories for correlating homologous and non-homologous primary and secondary positions; namely, a homologous or corresponding position cross-compare check relay category including the circuits having relays R9 through R14 therein; a non-homologous noncorresponding position right-offset compare category including the circuits having relays R15 through R19 therein; and a non-homologous noncorresponding position left-offset compare category including the circuits having relays R20 through R24 therein. The check relay contacts controlled by relays R9 through R24 are shown in Fig. 11, and are interposed between a single input line 101, and an error output line 102 or an equal output line 103.

*Operation and remaining circuits*

The several particular errors referred to hereinbefore; i.e., cross-compare, transposition-of-orders, right-offset and left-offset errors, will now be applied to the data comparator circuits shown in Figs. 10*a* through 10*c*, and Fig. 11.

Figure 8:
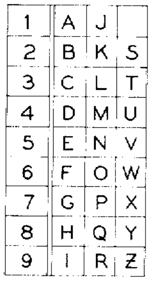
Fig. 8 shows the code configuration used to control the record card collating machine.

*Cross-compare.*—In accordance with the code shown in Fig. 8, the letters shown in Fig. 3 are represented by the numerals associated therewith. It is necessary to point out that although one numeral represents a plurality of letters, for example the numeral 2 represents the letters B, K and S, the number of errors occurring as a result thereof is not significant so that even with the occurrence of these errors, the over-all operation of the present invention is very efficient. It is possible, of course, to code each of the alphabetic letters separately in much the same fashion as is done on existing machines, such as the well-known Type 089 IBM Alphabet Collator, to thereby preclude any confusion whatsoever.

Referring to Fig. 3, inasmuch as the orders of primary and secondary data in the first three positions are equal, corresponding primary and secondary code relays to indicate equal, or matched, data positions will be picked for the first three homologous positions. This is also true of the fifth and sixth positions because the data within each of these positions are the same. The primary code relays picked are relays R1, R27, R36, R48–R49 and R64–R65. The secondary code relays picked are relays R5, R31, R40, R43, and R52–R53. However, a cross-compare unmatched condition will be detected in the fourth position because check relay R12 (see also Fig. 10*c*) will not be energized. That is, check relays R9, R10, R11, R13 and R14 will be energized to thereby indicate an unmatched condition in position 4. Relay R9, for example, is energized by power applied thereto from line 66 through contacts R1–2 normally open (n/o), R5–2 n/o, R2–2 normally closed (n/c), R6–2 n/c, R3–2 n/c, R7–2 n/c, R4–2 n/c, and R8–2 n/c, relay R9, to line 67. Relay R10 will be energized because only the contacts R27–2 and R31–2 are transferred, the remaining contacts in the relay R10 circuit remaining in a normal status. Similarly, relay R11 will be energized because contacts R36–2 and R40–2 are energized. Relay R13 will be energized because contacts R48–2, R49–2, R52–2 and R53–2 are transferred.

Along with the cross-compare operation whereby check relays R9 (Fig. 10*c*) –R11 and R13–R14, are picked, a right offset and a left offset non-homologous order comparison is caused to take place. As a result of the right offset comparison whereby the orders of primary data are caused to be compared with the next lower orders of secondary data, i.e., the primary order position 1 data with the secondary order position 2 data, check relay R16 is caused to pick due to only the second order position primary data and the third order position secondary data being equal. As a result of the left offset comparison whereby a primary data order is compared with the next higher secondary data order, i.e., the primary second order position with the secondary first order position, check relay R21 is caused to pick. In summation, as a result of the cross-compare, right offset and left offset data comparisons, check relays R9–R11, R13–R14, R16 and R21, are energized simultaneously.

Referring briefly to Fig. 2, it will be recalled that if the standard collator data compare apparatus as represented by blocks 55 and 56, initially determines the primary and secondary data expressions to be equal, the preferred embodiment of the present invention is bypassed. However, should these data expressions be determined by the aforementioned apparatus to be unequal, there still remains the possibility that the unequal condition is due to one of the aforementioned so-called human errors, whereby the preferred embodiment of the present invention will cause these latter mentioned unequal data expressions to be passed as matched data expressions. Of course, with the data expressions under consideration and shown in Fig. 3, the collator data comparing apparatus is represented by blocks 55 (Fig. 2) and 56 will determine these expressions of Fig. 3 to be unequal. Thus, a test impulse or signal will be directed from the data compare unit contacts 56 (Fig. 2) to the labyrinth of check relay contacts 54 via line 101. Thus, referring to Fig. 11, an electrical signal applied to input line 101 will be directed through check relay contacts R9–1 n/o, R10–1 n/o, R11–1 n/o, R12–1 n/c, R13–2 n/o and R14–2 n/o, to equal output line 102 via plugboard wiring and hubs 116, 117, 118 and 119. Consequently, a single cross-compare error will be passed as an equal. It is to be observed that only the cross-compare check relay contacts were analyzed. This, of course, is due to the fact that before any of the nonhomologous order comparing results as manifested by the check relays R15–R24, are analyzed, it is necessary that there be two unequal cross-compare homologous order data positions.

Figure 4:
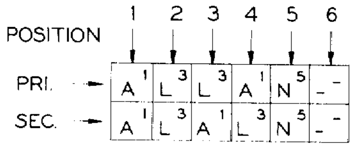

*Transposition-of-orders.*—Referring to Fig. 4, it will be seen that the first homologous position having an unmatched data condition therein is comparing position 3, and the second such position is comparing position 4. Thus, when the collator compare apparatus represented by blocks 55 (Fig. 2) and 56 detect the primary and secondary data expressions shown in Fig. 4 to be unequal, an impulse will be directed to check relay contacts block 54 via line 101. Prior to the transmission of this test signal via line 101, check relays R9 (see also Fig. 10*c*), R10, R13 and R14 will be picked to indicate equal orders of data in respective cross-compare comparing positions 1, 2, 5 and 6. In addition, the non-homologous comparison between primary position 3 with respective secondary position 4 and primary position 4 with respective secondary position 3, will cause the energization of relays R17, R21 and R22. That is, the right-offset comparison between primary order 3 and secondary order 4 will complete a circuit to relay R17, and the left-offset comparison between primary order 4 and secondary order 3 will complete a circuit to relay R22.

Referring once again to Fig. 11, an electrical impulse applied to equal input line 101 will be directed through contacts R9–1 n/o, R10–1 n/o, R11–1 n/c, R12–2 n/c, R17–1 n/o, R18–1 n/c, R22–1 n/o, R23–1 n/c, R13–3 n/o and R14–3 n/o, to equal output line 102 via plug wires and connecting plug hubs 110 through 119. Thus, as with a single cross-compare error, a transposition of adjacent orders of data is passed as matched data. It will be observed that the analysis of the check relay contacts shown in Fig. 11 first included the cross-compare check relay contacts associated with relays R9–R12. In response to the recognition of two cross-compare homologous order data unequals as represented by the de-energized state of relays R11 and R12, there followed an analysis of the right offset check relay contacts R17–1 and R18–1. Consequent upon the detection of only one right offset non-homologous order data unequal as manifested by relay R18, there followed a left offset comparison analysis. Due to the recognition of a single left offset non-homologous order data unequal as manifested by the de-energized state of relay R23, there followed an analysis of the cross-compare homologous order data positions as represented by the check relay contacts R13–3 and R14–3.

Figure 5:
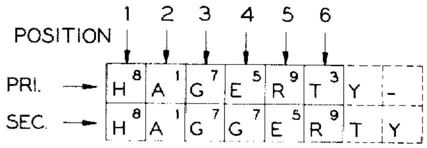

*Right-offset.*—As is shown in Fig. 5, the homologous positions having unmatched orders of data therein, are positions 4, 5 and 6. Consequently, when these primary and secondary expressions of data are manifested by the code relays shown in Fig. 10*a*, relays R9 (see also Fig. 10*c*) through R11 will be picked to represent the equal or matched orders of data in the order positions 1–3. In addition, due to right-offset comparing, check relays R17 through R19 will be picked so as to indicate that the data in primary orders 3, 4 and 5, are equal to the data in secondary orders 4, 5 and 6, respectively. It would be well to point out here that there are not any check relays caused to be picked due to left offset comparing. Of course, the collator compare apparatus as represented by units 55 (Fig. 2) and 56, will recognize the primary and secondary expressions shown in Fig. 5 as being unequal. This, will then cause an impulse to be directed from block 56 (Fig. 2) to block 54 via line 101. Hence, an electrical impulse applied to equal input line 101 (Fig. 11) will pass through contacts R9–1 n/o, R10–1 n/o, R11–1 n/o, R12–1 n/c, R13–2 n/c, R18–1 n/o and R19–1 n/o, to equal output line 102 through plug wires connecting the plug hubs 114 through 119. Hence, a right-offset of secondary data will be passed as matched data.

It is to be observed once again that in response to the recognition of two unmatched homologous order positions as manifested by the cross-compare check relays R12 and R13, there is caused an analysis of the right offset comparing check relay contacts R18–1 and R19–1.

Figure 6:
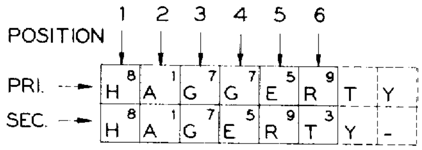

*Left-offset.*—Referring to Fig. 6, it may be seen that the homologous positions having unmatched data therein are once again positions 4, 5 and 6, and accordingly, check relays R9 (see also Fig. 10*c*) through R11 are picked. In addition, left offset comparing check relays R22 through R24 are picked so as to indicate that the data in primary orders 4, 5 and 6, are equal to the data in secondary orders 3, 4 and 5, respectively.

Of course, the collator data compare apparatus as represented by units 55 (Fig. 2) and 56, will recognize the primary and secondary data expressions shown in Fig. 5 to be unequal. Accordingly, as before a test impulse will be directed from unit 56 to the check relay contacts 54 via line 101. An electrical signal applied to input line 101 (Fig. 11) will be directed through contacts R9–1 n/o, R10–1 n/o, R11–1 n/o, R12–1 n/c, R13–2 n/c, R18–1 n/c, R22–1 n/o, R23–1 n/o and R24–1 n/o, to equal output line 102 via plug wires and plug hubs 112 through 119 connected thereto. It is to be observed that during the analysis of the cross-compare check relay contacts, there is caused to be an analysis of the right offset compare check relay contacts R18–1 in response to the manifestations of relays R12 and R13. Inasmuch as check relay R18 also manifests a right offset compare non-homologous order unequal, there is caused to immediately take place an analysis of the left offset comparing check relay contacts R22–1 to R24–1.

It is both necessary and desirable to point out at this time that the analysis circuit shown in Fig. 11, is not effective to reconcile all expressions of information falling within the afore-mentioned "human errors" categories, as matched expressions. For instance, a left-offset error of the type shown in Fig. 6, wherein a character is omitted from the secondary expression, will not always be caused to pass as a matched expression. As an example thereof, the following illustrated left-offset error caused by the omission of the character E in the name PESUPA, will not be passed as a matched expression notwithstanding that the second to fifth secondary positions are offset one position to the left with respect to the third to sixth primary positions:

PESUPA
PSUPA–

The circuit of Fig. 11 is effective to detect left-offset errors only if the symbol omitted in the secondary expression is one of a plurality of similar, adjacent symbols, such as the missing second "G" in the secondary expression HAGERTY of Fig. 6. This does not detract anything from the present invention, however. It must be remembered that heretofore all left-offset error expressions, for example, were detected as unmatched expressions, so that the improvement afforded by the use of an analyzing circuit as is shown in Fig. 11 lies in the fact that a substantially great number of problems which hitherto required human hand-filing operations to correct, are eliminated.

The analyzing circuit shown in Fig. 12 to utilize a greater number of relay contacts than that of Fig. 11, may be used in place of the one in Fig. 11 when it is desired to reconcile all expressions of information falling within the afore-mentioned "human errors" categories, as matched expressions. Thus, in the afore-cited example having the secondary expression PSUPA therein, relays R9, and R21–R24 will be picked, so that the said expression will be passed as a matched one as a result of an electrical impulse being directed from input line **101*a*** (Fig. 12) through check relay contacts R9*a* n/o, R10*a* n/c, R11*b* n/c, R16*b* n/c, R21*c* n/o, R22*b* n/o, R23*b* n/o and R24*b* n/o, to equal output line **102*a***.

To further show the operativeness of the analyzing circuit depicted in Fig. 12, it will be recalled that the transposition-of-orders condition shown in Fig. 4, caused cross-compare check relays R9 (see also Fig. 10*c*) R10, R13 and R14, right offset compare check relay R17, and left offset compare check relays R21 and R22, to be picked. Hence, when the test impulse is caused to be transmitted from the collator compare apparatus unit 56 (Fig. 2), a circuit may be traced from line **101*a* (Fig. 12) through contacts R9*a* n/o, R10*a* n/o, R11*a* n/c, R12*b* n/c, R17*c* n/o, R22*d* n/o, R13*c* n/o, and R14*d* n/o, to the equal output line 102*a*. This equal output pulse along line 102*a* would then be directed to the data compare control relays represented in Fig. 2 by block 57**.

Figure 7:
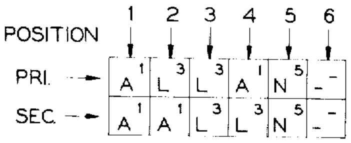
Fig. 7 illustrates a transposition-of-orders error between non-adjacent data positions.

*Transposition-of-orders: Non-adjacent positions.*—Whenever the data comparator detects errors of a type differing from those previously defined, the test impulse applied to input line 101 will be directed through the check relay contacts of Fig. 11 to error output line 103. For example, referring to Fig. 7, the homologous positions having unmatched data therein are positions 2 and 4, and as a result, check relays R10 and R12 will not be picked. Inasmuch as the unmatched data positions are not adjacent positions, this is detected as two separate and distinct cross-compare errors, and not as a transposition-of-orders error. Hence, since relays R10 and R12 are not picked, an electrical impulse impressed upon input line 101 will be directed as shown in Fig. 11 through check relay contacts R9–1 n/o, R10–1 n/c, R11–2 n/o, R12–2 n/c, R17–1 n/o, R18–1 n/c, R22–1 n/c, and R12–3 n/c, to error output line 103.

It is intended to include within the broad scope of the present invention the concept wherein one expression of information is shifted in one or a plurality of directions with respect to a predetermined starting position. This, of course, is to alter the correlative relationship between orders of the first, or primary, and the second, or secondary, data groups. This, as will be apparent to persons familiar with the art, is particularly desirable in, and applicable to, high-speed electronic data comparing operations. Such a data comparing device is shown and described in copending U.S. patent application Serial No. 419,420, filed on March 29, 1954, to employ a shifting register shown diagrammatically in Figs. 9*a* to 9*c*. Inasmuch as the principle of operation thereof is described in the aforementioned copending patent application, it will be described only briefly herein to avoid undue prolixity.

As is shown in Fig. 9*a*, a primary value 13315 is to be compared with a secondary value 13135. The homologous positions having orders therein which are unmatched, are positions 3 and 4. Thus, as the homologous positions are being analyzed one by one, upon the detection by data compare unit 121 of the second unmatched homologous data condition in position 4, the shifting register represented by broken line 120, and having therein the expression of secondary information, will be caused to shift the secondary data therein one position to the left (see Fig. 9*b*). Data compare unit 121 not only will detect the second unmatched position, i.e., position 4, but will also govern register control 122 so as to effect the aforesaid shift. Inasmuch as the afore-mentioned second unmatched condition occurred in comparing position 4, data comparison after the first shift to the left will begin with position 3 (see Fig. 9*b*), the position preceding the position having the second unmatched orders of data. As is shown, position 3 in Fig. 9*b* contains matched orders of data, whereas position 4 contains unmatched orders of data. Upon the detection of the unmatched data condition in position 4 of Fig. 9*b*, the shifting register 120 will once again be controlled by data compare unit 121 to effect a shift of the data therein. This shift, however, will be two positions to the right so as to align the orders of data in the manner shown in Fig. 9*c*. Data comparing after this shift of orders to the right will begin at position 4 of Fig. 9*c* wherein the orders of data are equal. However, the data in position 5 are not equal. The detection of the unequal orders of data in position 5 will cause the register control 122 to shift the secondary data in register 120 one order to the left for a second time. It may be seen that this third shift of data will return the data in the secondary expression of information, to the home, or starting, position shown in Fig. 9*a*. The unmatched condition detected during the preceding comparing operation (see Fig. 9*c*), i.e., the operation after the shift of data two positions to the right, causes comparing after the third, and last, shift of data to begin in position 5. Inasmuch as the orders of data contained in position 5 (Fig. 9*a*) are equal, the transposition of adjacent orders of data in positions 3 and 4 will be detected as such, and the two expressions of information will be indicated as matched by a pulse emitted from hub 123.

It is apparent that either or both primary and secondary expressions of information may be contained within shifting registers which can be controlled as taught herein.

Any one of the afore-mentioned errors, i.e., cross-compare, transposition-of-orders, right-offset and left-offset, which may be detected by the analyzing circuit of Fig. 11, may be selected singly by suitable plugboard wiring. For example, if it is desired to control the collator embodiment described hereinbefore so as to pass only record cards having truly matched data, the plugboard connection must be between plug hubs 118 and 119. On the other hand, if it is desired to pass only record cards having single cross-compare error data, the plugboard connection must be between plug hubs 116 and 119, whereas if it is desired to pass only record cards having a transposition-of-orders error, there must be an electrical connection between plug hubs 114 and 119. Similarly, only right-offset error and left-offset error record cards may be passed as matched by connecting plug hubs 112 and 119, and 110 and 119, respectively.

*Summary*

To briefly summarize the operation of the preferred embodiment of the present invention, orders of primary record card data are entered into the code relay pick unit 75 (Fig. 10*a*)–80, whereas secondary record card data orders are entered into similar and corresponding code relay pick units 81–86. As brought out previously, the record card data is stored in a special four relay code realized by the energization of select ones or more of four code relays within each data order position. If the secondary data expression as manifested by the operation of secondary data code relays within units 81–86, matches the primary data manifested by the code relays within units 75–80, the machine data compare apparatus as represented by units 55 (Fig. 2) and 56 will cause an equal data signal to be applied directly to the data compare control relays block 57. In other words, the apparatus defined by the present invention and represented in Fig. 2 by block 50, would be by-passed should the primary and secondary expressions actually be equal. However, should the primary and secondary data expressions be unequal as determined by the data compare apparatus of the machine, a test signal would be directed to line 101 (Fig. 11), or 101*a* (Fig. 12).

During the operation of the machine data compare apparatus as represented by units 55 (Fig. 2) and 56, the so-called cross-compare (Fig. 10*c*), right offset compare, and left offset compare circuits are effective simultaneously to compare the homologous and non-homologous orders of primary and secondary data. Wherever cross-compare orders of data are equal, the corresponding check relays R9–R14 will be energized. Similarly, wherever the non-homologous orders of data are equal, those check relays R15–R24 will be energized. After select ones of these check relays are energized, their associated contacts in the data compare circuits shown in Figs. 11 and 12 will be transferred so that a test impulse directed via line 101 will be directed to either equal output line 102 (Fig. 11) or unequal output line 103. As stated previously, if the voltage signal is directed to equal output line 102, it simply means that the primary and secondary data expressions determined to be unequal by the data compare apparatus of the machine shown diagrammatically in Fig. 2, are determined by the present invention to have a predetermined relationship with one another so as to nevertheless be passed as equal data expressions. However, a voltage impulse along unequal line 103 means that the primary and secondary data expressions do not bear such a relationship as to be passed as equal data expressions.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A data comparator for comparing a primary multi-order data group with a secondary multi-order data group comprising primary data manifesting means, secondary data manifesting means, means governed by said primary and said secondary data manifesting means for correlating homologous and non-homologous orders of the primary and the secondary data, means controlled by said correlating means for simultaneously comparing homologous and non-homologous orders of primary and secondary data so as to detect unmatched orders thereof, electrical circuit means governed by said homologous order comparing means for analyzing the relationship of the primary and the secondary multi-order data groups order-by-order, other electrical circuit means governed by said non-homologous order comparing means for analyzing the relationship of the primary and the secondary multi-order data groups order-by-order, and means for directing a data compare test impulse to said other electrical circuit means via said electrical circuit means in response to the analysis of a predetermined number of unmatched orders of homologous data.

2. A data comparator for comparing a primary multi-order data group with a secondary multi-order data group comprising primary data manifesting means, secondary data manifesting means, means controlled by both manifesting means for correlating orders of the primary and the secondary data according to a first relationship, means controlled by both manifesting means for correlating orders of the primary and the secondary data according to a second relationship, means controlled by the first relationship correlating means for comparing the orders of primary and secondary data correlated according to the first relationship, other means controlled by the second relationship correlating means for comparing the primary and secondary data correlated according to the second relationship, and electrical circuit means including a data compare test impulse connected to be governed by said first and said second relationship comparing means for analyzing the relationship of the primary multi-order data group with the secondary multi-order data group.

3. In a data comparator for simultaneously comparing a plurality of orders of data manifestations in two groups, said comparator having a compare checking test signal input means and an output means, the combination of; means for comparing each of homologous orders of said data so as to detect manifest matched and different numbers of unmatched homologous order positions thereof; and means controlled by said comparing means for analyzing the manifestations thereof so as to complete a circuit to interpose a first channel between the input and output means consequent upon the detection of matched homologous order positions, another circuit comprising a second channel between the input and output means consequent upon the detection of a single unmatched homologous order position, and yet another circuit comprising a third channel between the input and output means consequent only upon the detection of a plurality of unmatched homologous order positions.

4. In a data comparator having an electric circuit network comprising an input line, an equal output line and an unequal output line, the combination of apparatus comprising a first and a second electric channel each of which is adapted to be interposed in parallel circuit fashion between said input line and said equal output line; a third electric channel adapted to be interposed between said input line and said unequal output line; means for comparing homologous order positions of two groups of data so as to detect positions thereof having matched and unmatched data; and analyzing means controlled by said comparing means for completing a circuit and thereby interposing said first channel consequent upon the detection of matched homologous order positions, completing another circuit and thereby interposing said second channel consequent upon the detection of a single unmatched homologous order position, and completing yet another circuit to interpose said third channel consequent upon the detection of a plurality of unmatched homologous order positions.

5. A data comparator device of the class described comprising an input line; an equal output line; an unequal output line; an electric circuit network including at least a pair of electric channels, the first of which is adapted to be interposed between said input and said equal output lines, and the second of which is adapted to be interposed between said input and said unequal output lines; first means for cross-comparing homologous order positions of two groups of data so as to detect the homologous positions thereof having matched and unmatched data; second means for offset comparing non-homologous order positions of data so as to detect non-homologous positions having matched and unmatched data; electric switching means comprising a portion of said first channel controlled by said first comparing means connected to complete a circuit and thereby interpose said first channel; other electric switching means comprising a portion of said second channel controlled by said second comparing means to complete another circuit for interposing said second channel and disabling said first channel consequent upon the detection of a predetermined number of unmatched homologous position data.

6. In a data comparator of the class described, the combination of means for manifesting data, means controlled by said manifesting means for comparing homologous orders of data so as to detect homologous order positions having matched and unmatched data, means also controlled by said manifesting means for comparing non-homologous orders of data so as to detect non-homologous order positions having matched and unmatched data; and means controlled by both comparing means rendered operative in response to the detection of a predetermined number of homologous order positions having unmatched data for effecting an analysis of the non-homologous order comparing means.

7. In combination with a data comparator having an electric circuit network comprising an input line, an equal output line, and an unequal output line, means responsive to two groups of data for comparing homologous order positions of data so as to detect positions thereof having matched and unmatched data, means including a plurality of first switches governed by said homologous order comparing means for connecting said input and said equal output lines consequent upon the detection of matched homologous order data positions and a predetermined number of unmatched homologous order data positions, means simultaneously operable with said homologous order comparing means for comparing non-homologous order positions of data so as to detect positions thereof having matched and unmatched data, other means including a plurality of second switches governed by said non-homologous order comparing means and connected at one end thereof to said unequal output line, and switching means governed by said homologous order comparing means for connecting said first switches to said second switches so as to connect said input and said unequal output lines consequent upon the detection of more than a predetermined number of unmatched homologous order data positions.

8. A data comparator comprising first means for comparing homologous orders of primary and secondary data so as to detect homologous order positions having matched and unmatched data, second means governed by said first means for shifting the secondary data and for comparing non-homologous orders of data so as to detect non-homologous order positions having matched and unmatched data, first analyzing means including a plurality of series circuit connected switches, one for each homologous order, governed by said first comparing means to indicate matched and unmatched homologous orders of data, second analyzing means including a plurality of other series circuit connected switches, one for each non-homologous order, governed by said second comparing means to indicate matched and unmatched non-homologous orders of data, and switching means controlled by said first comparing means for connecting the one of said switches corresponding to the second unmatched homologous order to a switch of said second analyzing means corresponding to a non-homologous order including the secondary datum in said second unmatched homologous order.

9. A method for comparing multi-order expressions of primary and secondary data comprising the steps of comparing homologous orders of the primary and secondary data expressions; simultaneously therewith right offset comparing primary orders of data with respective next following secondary orders of data, and left offset comparing primary orders of data with respective next preceding secondary orders of data; analyzing first the homologous order comparison results as manifested by switches operated consequent upon the data comparison for successive homologous orders so as to detect matched and the first and second unmatched homologous orders; analyzing next the right offset order comparison results as manifested by other switches operated due to the nonhomologous data comparison for successive non-homologous orders so as to detect matched and an unmatched right offset order, and beginning the right offset order analysis at the non-homologous right offset order including the primary data next preceding the primary data within the aforesaid second unmatched homologous order; then analyzing the left offset order comparison results as manifested by still other switches operated due to the left offset non-homologous data comparison for successive non-homologous orders so as to detect matched and an unmatched left offset order, and beginning the left offset order analysis at the non-homologous order including the primary data within the unmatched right offset non-homologous order; and finally analyzing the homologous order comparison results as manifested by the aforesaid switches operated due to the homologous data comparison for successive homologous orders, and beginning this latter analysis at the homologous order including the primary data within the left offset unmatched homologous order.

References Cited in the file of this patent

UNITED STATES PATENTS

| | | |
|---|---|---|
| 2,343,273 | Avery | Mar. 7, 1944 |
| 2,379,828 | Rubidge et al. | July 3, 1945 |
| 2,602,544 | Phelps et al. | July 8, 1952 |
| 2,624,459 | Shafer | Jan. 6, 1953 |